United States Patent [19]

Ginzburg

[11] Patent Number: 5,347,837
[45] Date of Patent: * Sep. 20, 1994

[54] METHOD OF ROLLING USING BENDABLE SLEEVED ROLL

[75] Inventor: Vladimir B. Ginzburg, Pittsburgh, Pa.

[73] Assignees: International Rolling Mill Consultants, Inc.; United Engineering, Inc., Pittsburgh, Pa.

[*] Notice: The portion of the term of this patent subsequent to Mar. 10, 2009 has been disclaimed.

[21] Appl. No.: 839,128

[22] Filed: Feb. 20, 1992

Related U.S. Application Data

[63] Continuation-in-part of Ser. No. 508,985, Apr. 12, 1990, Pat. No. 5,093,974.

[51] Int. Cl.5 .................... B21B 27/03; B21B 31/18
[52] U.S. Cl. ...................... 72/243.6; 491/1; 72/247
[58] Field of Search .............. 72/24.12, 24.14, 243.6, 72/247, 1; 29/447

[56] References Cited

U.S. PATENT DOCUMENTS

| | | | |
|---|---|---|---|
| 2,187,250 | 1/1940 | Sendzimir | 72/241.06 |
| 3,879,828 | 4/1975 | Troost | 29/447 |
| 4,407,151 | 10/1983 | Gronbech | 72/247 |
| 4,479,374 | 10/1984 | Feldmann et al. | 72/241.2 |
| 4,601,188 | 7/1986 | Sendzimir | 72/247 |
| 4,669,296 | 6/1987 | Bald | 72/247 |
| 4,683,744 | 8/1987 | Ginzburg et al. | 72/243.6 |
| 4,722,212 | 2/1988 | Ginzburg et al. | 72/241.2 |
| 4,813,258 | 3/1989 | Ginzburg | 72/241.2 |
| 5,093,974 | 3/1992 | Ginzburg | 72/252.5 |

FOREIGN PATENT DOCUMENTS

| | | | |
|---|---|---|---|
| 0068515 | 6/1981 | Japan | 72/247 |
| 0064103 | 4/1984 | Japan | 72/247 |
| 2202174 | 9/1988 | United Kingdom | 72/247 |

*Primary Examiner*—Lowell A. Larson
*Assistant Examiner*—Thomas C. Schoeffler
*Attorney, Agent, or Firm*—Armstrong, Westerman, Hattori, McLeland and Naughton

[57] ABSTRACT

A method of rolling an elongated workpiece in the form of a sheet or strip and of reducing edge drop during rolling comprising passing the workpiece through at least one pair of opposed work rolls which comprise an arbor and a hollow sleeve shrink-fitted over the arbor and having end portions defining, between the arbor and sleeve, a cavity providing a self-compensating flexible roll end portion which is placed over and extends beyond a longitudinal edge of the workpiece during rolling. Preferably, the shrink-fitted portion is provided with maximum radial stress at the middle thereof and decreasing toward the ends of the shrink-fitted zone. The work rolls may be backed up with self-compensating backup rolls to further improve uniformity of the rolled workpiece by reducing crown variation thereof. Positioning of the rolls is accomplished by axial shifting.

4 Claims, 13 Drawing Sheets

METHOD OF ROLLING USING BENDABLE SLEEVED ROLL

This application is a continuation-in-part of U.S. patent application Ser. No. 07/508,985, filed Apr. 12, 1990 in the name of Vladimir B. Ginzburg for Bendable Sleeved Roll, now U.S. Pat. No. 5,093,974.

This invention relates to a bendable sleeved roll for reducing the thickness of a flat workpiece in a rolling mill, to a method for assembling the roll, and a method of rolling an elongated metal workpiece.

A sleeved roll generally has a sleeve which is shrunk-fit onto an arbor. The interference of the fit is typically between 0.0006 to 0.0010 mm/mm of the arbor diameter to prevent axial sliding of the sleeve relative to the arbor. A sliding sleeve condition may result in off-specification product. Sliding is of particular concern during roll bending practices when a roll is designed to be bent by the application of large rolling forces on the roll necks to roll a product to a particularly tight specification.

FIG. 1 schematically shows a conventional prior art roll 20, which generally has an arbor 22 and a sleeve 24. As shown, the sleeved roll 20 backs up a work roll 26 for rolling a workpiece 28. Work rolls of a two high mill also may be sleeved in, e.g., tension rolling units (not shown). The arbor 22 of the prior art roll 20 shown has a cylindrical peripheral surface on which the sleeve 24 is shrunk-fit. FIG. 6(a) schematically shows the stress pattern of the radial stresses induced as a result of the interference fit in the sleeve 24 by the arbor 22 of the roll 20. Also, FIG. 6(a) implies that the resulting frictional forces resisting relative sliding of the sleeve 24 is substantially constant along the entire roll 20 (the frictional force being directly proportional to the radial stress). Thus, there are significant radial forces induced in the axial ends of the sleeve 24 and there is significant frictional resistance to sliding as well.

The rolling forces P/2 applied to the roll necks 30 tend to bend the roll 20 (and the work roll 26) as is shown in FIG. 1. The outer axial portions 32 of the arbor 22 elongate as shown and the sleeve 24 due to its inner strength tends to resist the elongation of the arbor 22. As a result, shear stresses are induced in the interface of the upper portion of the arbor 22 and sleeve 24. Simultaneously, the inner axial portions 34 of the arbor 22 compresses as shown in FIG. 1 and the sleeve 24 due to its inner strength tends to resist the compression of the arbor 22. As a result, shear stresses are also induced in the interface of the lower portion of the arbor 22 and sleeve 24. The shear stresses acting at the upper and lower interface zones have opposite signs. Curves 36, 38 of FIG. 2 schematically shows the distribution of the shearing stresses induced in the interface zones of the upper portions and lower portions of the arbor 22 and sleeve 24. During rotation of the roll, the magnitude and sign of the shear stresses cyclicly changes. The combination of cyclic fatigue with the high induced shear stresses, shrink-fitting radial stresses and rolling forces on the axial ends of the sleeve 24 may lead to a condition known as "tire rolling" where the sleeve 24 tends to flatten. In addition, the roll overloading may produce lock-in stresses which result in a distortion of the sleeve outer surface known as "roll eccentricity."

The art has attempted to reduce the combined stress level by various means. The interference fit can be increased to increase the frictional forces for preventing relative sliding, but, interferences above about 0.0010 m/m of arbor diameter must be made with caution in order not to generate excessive radial stresses. Alternatively, the coefficient of friction between the arbor and the sleeve can be increased without increasing the radial stresses by providing interlocking grooves, epoxies or small hard particles in the interface. Also, superfinished shrink-fit surfaces may be employed to develop molecular frictional forces. These alternative techniques still fail to eliminate the problem while undesirably complicating the manufacturing process.

Self compensating bendable rolls have been developed which inherently reduce shear stresses near their axial ends. These self-compensating rolls have concentric sleeves and arbors with their adjacent axial ends radially spaced from each other. Thus, shear stresses can not be induced across these axial spaces. Such rolls are described in U.S. Pat. Nos. 4,813,258; 4,722,212 and 4,683,744 and in "Strip Profile Control with Flexible Edge Backup Rolls", *Iron and Steel Engineer*, July 1987 pages 23–34 by V. B. Ginzburg, which disclosures are hereby incorporated by this reference for their descriptions of bendable sleeved rolls and methods for assembling and employing them in rolling mills.

It has been found that self-compensating sleeved rolls manufactured by a shrink-fit process may not transmit substantially constant radial stresses along the shrink-fit zone. This is especially true when prior to shrink-fitting, both the arbor 42 and sleeve 44 have cylindrical shapes along the shrink-fit zone 46 as shown in FIG. 3. FIG. 3 schematically shows a self-compensating roll 40 generally having an arbor 42 and a sleeve 44. The arbor 42 has an axially extending shrink-fit zone 46 axially between two end zones 48. The sleeve 44 has a confronting shrink-fit zone 50 axially between two end zones 52. As shown, the arbor end zones 48 are radially spaced from the sleeve end zones 52. However, as FIG. 3 also shows, the arbor shrink-fit zone 46 may not be in continuous contact with the sleeve shrink-fit zone 50. FIG. 3 specifically shows a condition where the radially adjacent shrink-fit zones 46, 50 abut only at their edges. It is believed that one or more discontinuities develop in the shrink-fit zone during the fitting step when (in the case where the sleeve shrinks on the arbor) the sleeve ends zones 52 continue to shrink after the sleeve shrink-fit zone 50 initially contacts the arbor shrunk-fit zone 46 and thereby tends to arch the sleeve shrunk fit zone 50 away from the arbor shrink-fit zone 46. In addition, the existence of a pocket 54 may result in a flat portion on the roll face if the rolling forces are sufficiently high to collapse the pocket 54.

SUMMARY OF THE INVENTION

The present method uses improved rolls in rolling metal sheet and strip workpieces having a reduced variation of the workpiece crown with variation of roll face, rolled material hardness and width, and degree of reduction; and reduced edge drop.

Bendable sleeved rolls embodying the present invention are less susceptible to tire rolling and provide substantially more uniform radial stress profiles across their shrunk-fit zones than the prior art rolls.

An improved roll embodying the present invention generally has a bendable arbor having an axis and a diameter. A hollow sleeve having an inner diameter is shrunk-fit on the arbor along its axis such that the dimensional difference between the diameter of the arbor and the inner diameter of the hollow sleeve varies along the axis of the arbor. Thus the shrink-fit stresses vary along the axis. Preferably the dimensional difference in diameters which creates the interference fit is at a maximum in the central portion of the shrink-fit and is at a minimum at the axial edges of the shrink-fit. At least one of the shrink-fit surfaces of the arbor and hollow sleeve is axially contoured to provided a variable interference fit.

A preferred embodiment of an improved roll of the present invention generally has an axis with a surface extending between two axial ends for reducing the thickness of a workpiece in a rolling mill. The roll has a bendable arbor with an axially extending convexly contoured shrink-fit zone and a first end zone disposed axially of the shrink-fit zone and adjacent a first axial end of the roll. A concentric hollow sleeve has an inner surface. The sleeve inner surfaces has a shrink-fit zone disposed radially of the convexly contoured shrink-fit zone of the arbor and a first end zone disposed both axially of the sleeve shrink-fit zone and radial of the arbor first end zone. The radially adjacent first end zones of the arbor and sleeve are adapted to be axially moveable relative to each other when the arbor is bending.

In one form of the preferred embodiment of the invention, the first end zones of the sleeve and arbor abut each other and the first sleeve end zone is adapted to slide over the first arbor end zone, there being low or negligible radial stresses induced in the sleeve end zone in the fitting step. In another form of the preferred embodiment, the adjacent first end zones of the arbor and sleeve are radially spaced apart and define a cavity. The cavity may be advantageously employed in a flexible edged roll of the type disclosed in U.S. Pat. Nos. 4,683,744 and 4,813,258 and in a self-compensating roll of the type disclosed in U.S. Pat. No. 4,722,212.

Rolls embodying the present invention are advantageously employed as work rolls or as backup rolls in a rolling mill.

Rolls embodying the present invention are assembled by providing a bendable arbor having an axially extending peripheral surface and a hollow sleeve having an inner diameter. At least a portion of the shrink-fit surface of the arbor and/or the sleeve is axially contoured. The hollow sleeve having an inner surface is then shrunk-fit on the arbor. Preferably, radially adjacent end portions of the arbor and sleeve disposed axially of their shrunk-fit portions are adapted to be axially moveable relative to each other when the arbor is bending in a rolling mill. Thus, the radially adjacent abutting end zones are designed to develop no more than relatively low stresses and preferably to effect a sliding fit with negligible stresses between the radially adjacent end zones. Self-compensating bendable rolls are designed with radially spaced end zones.

Other details, objects and advantages will become apparent as the following description of preferred embodiments thereof proceeds.

DESCRIPTION OF THE PREFERRED EMBODIMENTS

Figure 1:
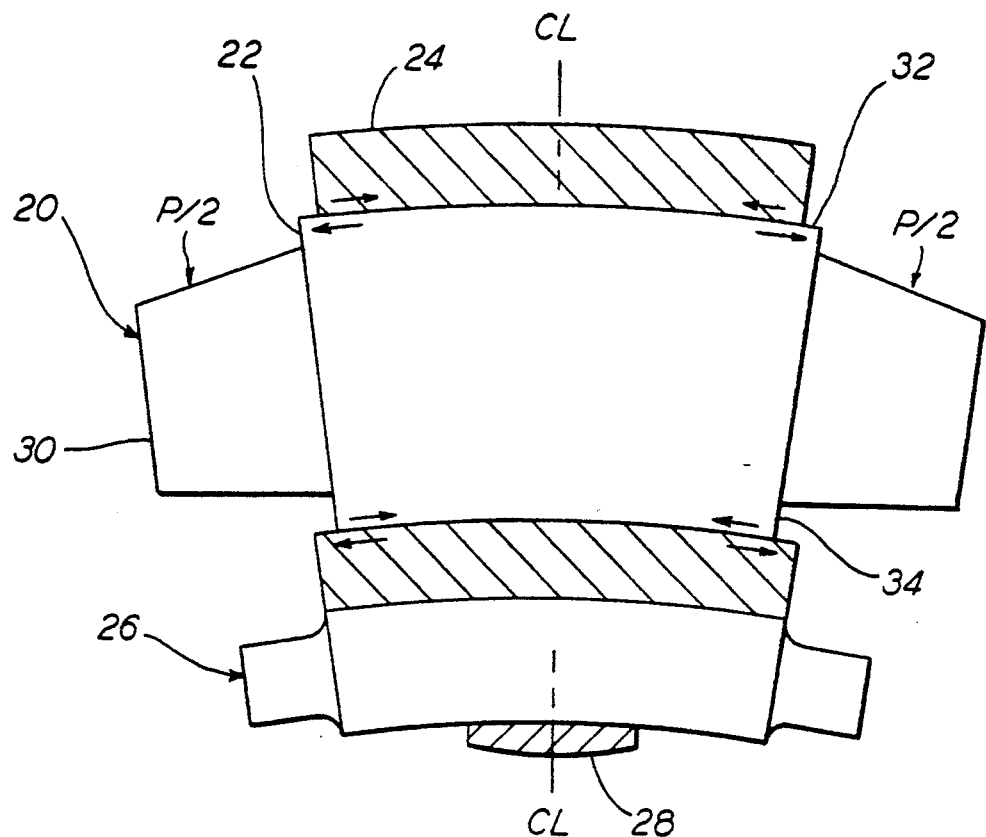
FIG. 1 is a front view of a prior art sleeved backup roll.
Figure 2:
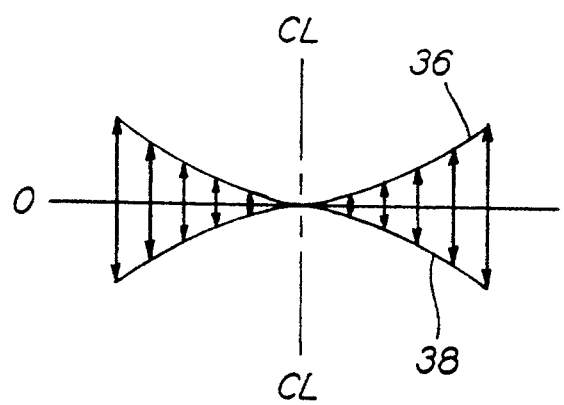
FIG. 2 is a stress diagram generally showing the shear stress pattern which develops in the prior art roll of FIG. 1 due to bending.
Figure 3:
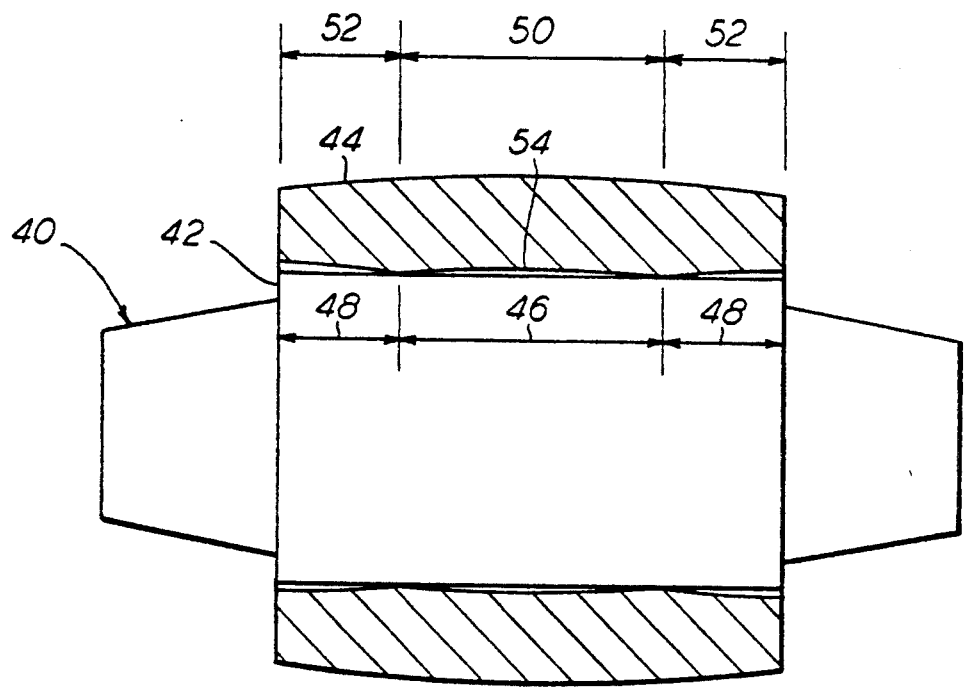
FIG. 3 is a front view of a prior art self-compensating roll.
Figure 4:
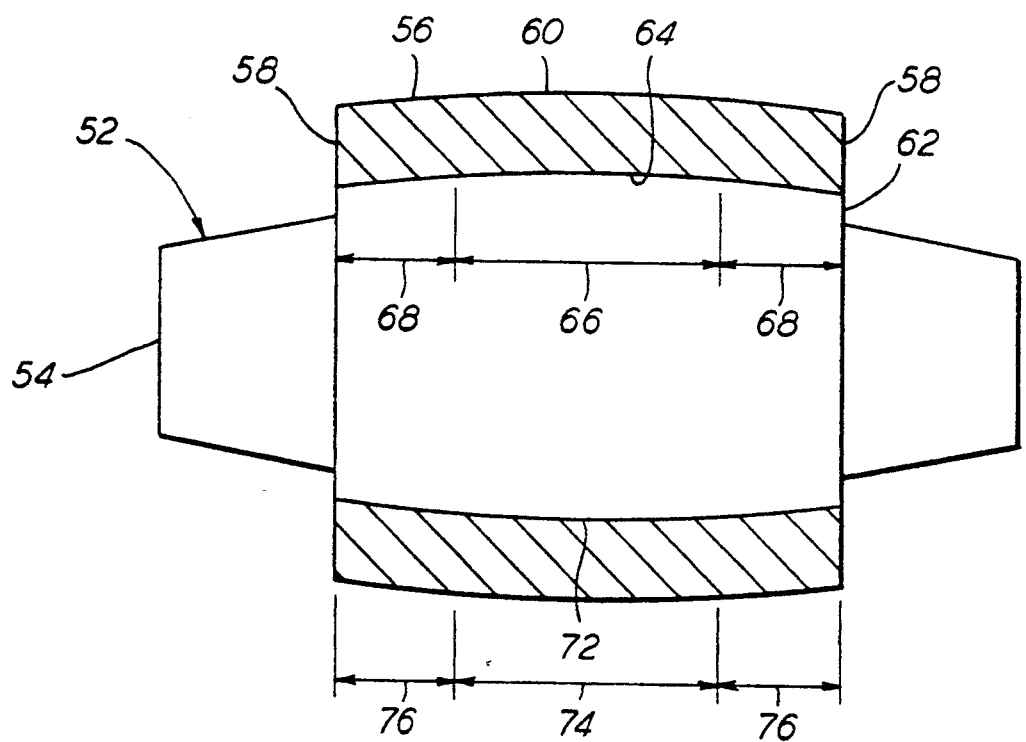
FIG. 4 is a front view of a sleeved roll embodying the present invention.

FIG. 4 illustrates a sleeved roll 52 embodying the present invention. The roll 52 generally has an axis 54 and an outer surface 56 extending between its axial ends 58. The roll 52 generally comprises a sleeve 60 shrunk fit on a bendable arbor 62. Rolls embodying the present invention may be employed to reduce the thickness of flat workpieces of metal, rubber, polymer or paper in a rolling mill. Also, such rolls are advantageously employed in mills for rolling such high strength materials as aluminum and steel. Where a roll 52 is to be employed in a steel or aluminum rolling mill, the sleeve 60 may be preferably forged steel and the arbor 62 may be forged or cast steel. Generally speaking, the shrink-fit may be effected by heating the sleeve 60 and/or chilling the arbor 62, preferably vertically orienting the axes of the sleeve 60 and arbor 62, concentrically aligning the sleeve 60 and arbor 62 and then bringing the assembly to room temperature.

The arbor 62 has an axially extending peripheral surface 64 which comprises a shrink-fit zone 66 and at least one end zone 68 disposed axially of the shrink-fit zone 66. The arbor 62, as shown, has a shrink-fit zone axially between two end zones 68.

The sleeve 60 generally has an inner surface 72, which comprises a shrink-fit zone 74 and at least one end zone 76 disposed both axially of the shrink-fit zone 74 and radially of the arbor end zone 68. The sleeve 60, as shown, has a central shrink-fit zone 74 axially disposed between two end zones 76.

Figure 6A:
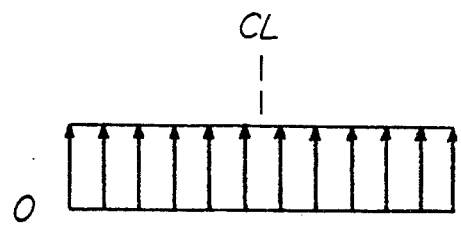
FIGS. 6(A)–6(D) are stress diagrams comparing the stress patterns of the rolls of FIGS. 1, 4 and 5 developed by shrink-fitting steps.
Figure 6B:
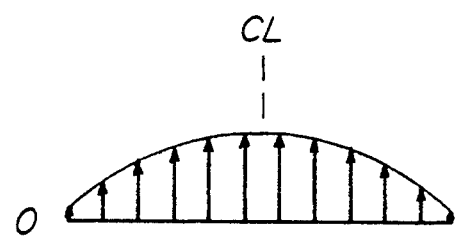

The arbor shrink-fit zone 66 is axially convexly contoured. It may present the general shape of a truncated cone or a caret to the sleeve 60. Preferably, the shrink-fit zone presents a continuously curved convex contour and, most preferably, a parabolic contour. In accordance with the present invention, the interference fit between the sleeve 60 and the arbor 62 varies along the axis 54 of the arbor. Preferably, as is shown in FIG. 6(B), maximum radial stresses are developed in the central portion of the shrink-fit zone at the centerline of the roll 52 and the radial stresses axially decrease toward the ends 58 of the roll 52. This stress pattern is developed by providing a maximum interference at the centerline between the arbor diameter and the radially adjacent sleeve inner diameter of about 0.001 mm/mm arbor diameter or more and then decreasing the dimensional difference of the diameters toward the axial ends 58.

Figure 6C:
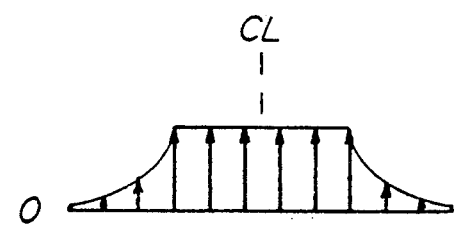

The radially adjacent end zones 68, 76 of the arbor 62 and the sleeve 72 respectively are abutting as shown. In a preferred embodiment of the present invention, the sleeve end zone 76 is adapted to slide over the arbor end zone 68 without generating substantial frictional or shear stresses when the roll 52 is bent. Thus, a sleeve 60 which is to be fitted on an arbor 62 has a minimum diameter in the sleeve end zone 76 at any given point along the roll axis 54 which is no less than the diameter of the radially adjacent portion of the arbor end zone 68 minus 0.0005 mm/mm or arbor diameter. This relative relationship between the radially adjacent end zones will not develop an effective shrink fit between the end zones 68, 76. The end zones 68, 76 may be generally cylindrical or contoured. The sliding fit between the radially adjacent end zones 68, 76 develop negligible radial stresses between them as shown by FIG. 6(C) so that negligible frictional forces and shear stress develop during bending.

It is difficult to maintain an alignment of a large sleeve 60 and a large arbor 62 when the concentric sleeve 60 is shrunk on the convex surface 64 because the initial contact occurs over a relatively small area. Although the outer surface 56 can be machined to obtain a cylindrical surface, a misalignment may result in excessive localized forces between the sleeve 60 and arbor 62 at the ends 58 of the roll 52. Thus, it may be desirable to provide a temporary annular collar at one end 58 of the roll 52 and align the sleeve 60 concentrically with the arbor 62 and against the collar (not shown) during the assembly process. After the roll 52 is assembled, the collar may be removed.

Figure 5:
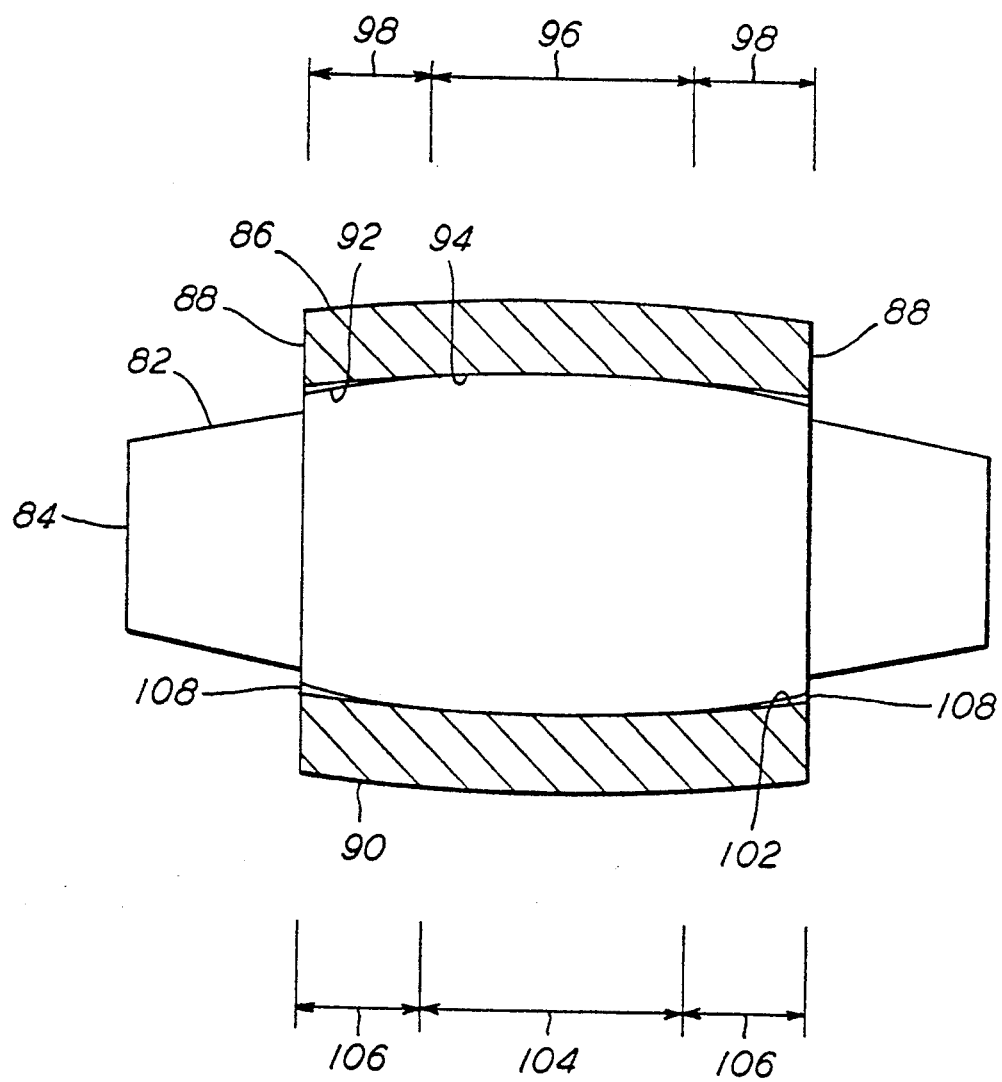
FIG. 5 is a front view of a self-compensating roll embodying the present invention.
Figure 7:
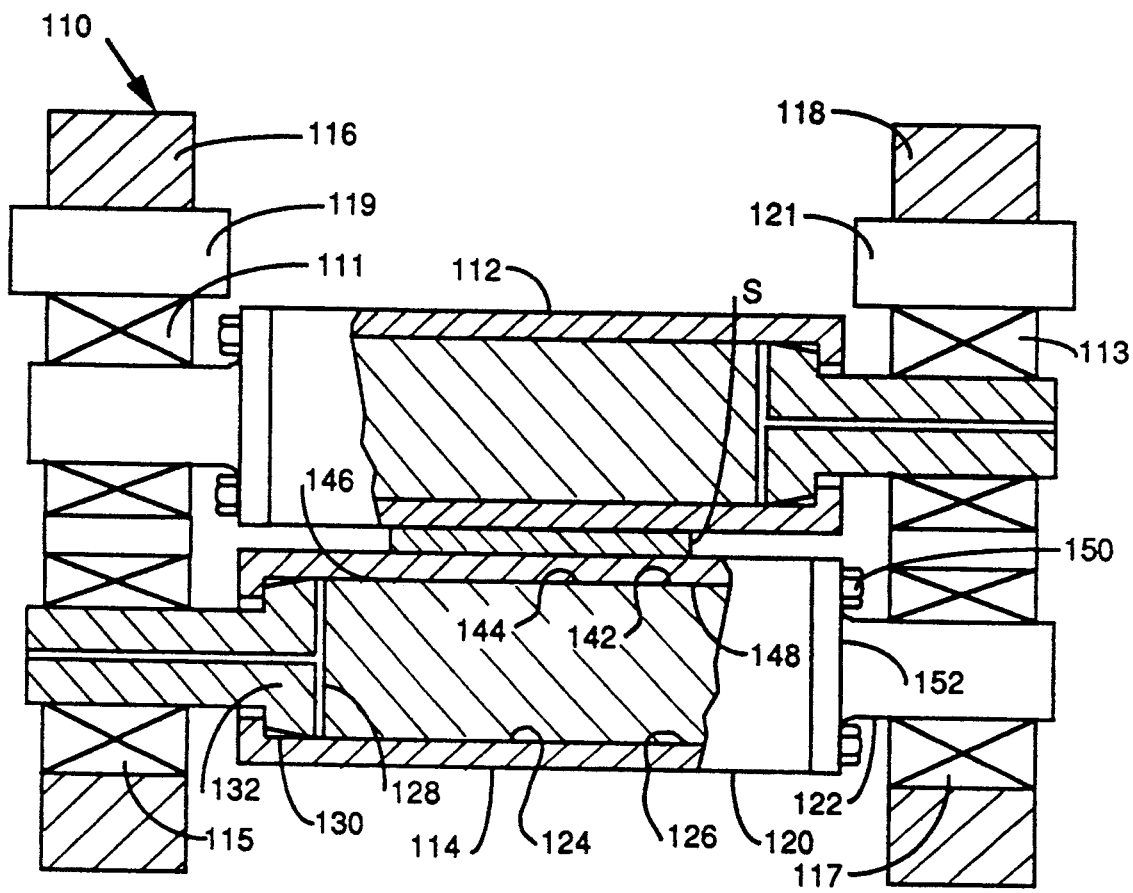
FIG. 7 is a schematic front view of rolls embodying the present invention wherein the rolls are employed as work rolls in a two-high mill.

FIG. 5 illustrates a self-compensating roll 82 embodying the present invention, which is generally similar to the first embodiment shown in FIG. 4. Thus, the roll 82 of FIG. 5 generally has a roll axis 84, a roll surface 86 and axial ends 88. Also, a sleeve 90 is shrunk on an arbor 92. The arbor 92 has an axially extending surface 94 comprising a convexly contoured shrink-fit zone 96 axially adjacent ends zones 98. The sleeve has an inner surface 102 comprising a shrink-fit zone 104 axially adjacent sleeve end zones 106. Unlike the embodiment of FIG. 4, the adjacent end zones 98, 106 of the arbor 92 and the sleeve 90 are spaced apart and generally define cavities 108. The cavities 108 are advantageously employed in self-compensating rolls to provide clearances so that the arbor 92 may bend relative to the sleeve 90. See, e.g., U.S. Pat. No. 4,722,212. The cavities 108 may be contoured by the initial shape of the sleeve 90 and arbor 92 and/or by machining the end zones 98, 106 after the sleeve 90 has been shrunk on the arbor 92. Cavities 108 may also be employed to contain fluids under high pressure in flexible edged rolls, as is shown in FIG. 7. Also, see, e.g., U.S. Pat. Nos. 4,813,258 and 4,683,744.

Figure 6D:
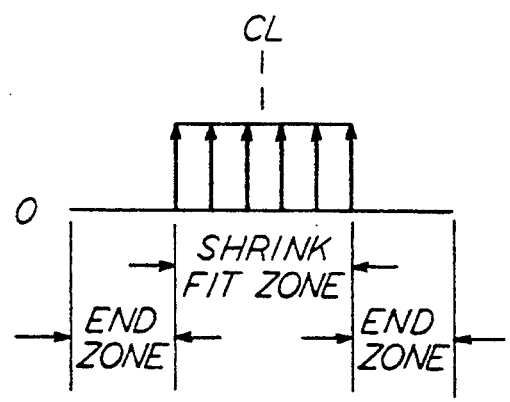

A roll 82 as shown in FIG. 5 is particularly useful for rolling high strength materials such as aluminum. Such a roll was designed for a 2000 mm (80 inch) wide 4-high reversing cold mill having a maximum roll separating force of 2,000,000 Kg (4,400,000 pounds). A cylindrical sleeve 90 had an initial nominal inner diameter of 1065 mm (41.960 inches) and an initial outer diameter of 1435 mm (56.5 inches). A continuously contoured arbor 92 had an outer diameter at its axial ends 88 of 1064 mm (41.900 inches), a centerline shrink-fit diameter of 1067 mm (42.000 inches) and axially intermediate diameters at the edges of the central shrink-fit zone of 1066 mm (41.98 inches). The sleeve 90 was first heat shrunk onto the arbor 92 and then outer surface 86 of the roll was machined and ground to a diameter of 1422 mm (56 inches). The roll cavity 108 had a gap of about 0.38 mm (0.015 inches) at the ends 88 of the roll 82. It is noted that the end diameter of the fitted sleeve was less than the initial diameter of the sleeve and that a gap of 0.38 mm is about 20% less than a theoretical gap based upon half the difference between the initial dimensions of the sleeve 90 and arbor 92. The ideal stress pattern developed in the sleeve 86 during the shrink fit step is shown in FIG. 6(D).

Thus, rolls embodying the present invention, such as the rolls 52 and 82, which have such axially convex shrunk-fit surfaces tend to maintain good eccentricity in the shrink-fit zone and near their axial ends 58, 98, respectively.

FIG. 7 shows a 2-high mill 110 having work rolls 112, 114 embodying the present invention which axially extend between frame members 116, 118 for rolling a flat workpiece "S" to a thinner product. The work rolls 112, 114 are essentially identical although oppositely oriented. Top work roll chocks 111 and 113 are provided at the ends of top work roll 112, while bottom work roll chocks 115 and 117 are provided at the ends of the bottom work roll 114, with hydraulic roll gap control cylinders 119 and 121 provided in the frame members 116 and 118, respectively. Each work roll 112, 114 has a sleeve 120 and an arbor 122. Each arbor 122 has an arbor surface 124 which generally comprises an axially extending convexly contoured shrink-fit zone 126 and an axially adjacent end zone 128 which defines a wall of a cavity 130 communicating with passageway 132. As shown, the arbor shrink-fit zone 126 may be adjacent one of its ends. Each sleeve 120 has an inner surface 142 generally comprising a shrink-fit zone 144 and an axially adjacent end zone 146 which defines a second wall of the cavity 130. As is shown, the end 148 of the sleeve adjacent its shrunk-fit zone may be fastened by bolts such as bolt 150, or other suitable fastening means including welding, to a flange 152 integral with or welded to the arbor 122 for rotating the sleeve 120 with the arbor 122. As is disclosed by the prior art patents, the work rolls 112, 114 are asymmetrical because only the end of each roll 112, 114 adjacent the cavity 130 is bent and/or subjected to high pressure fluids for radially expanding the sleeve end zones 146.

Figure 8:
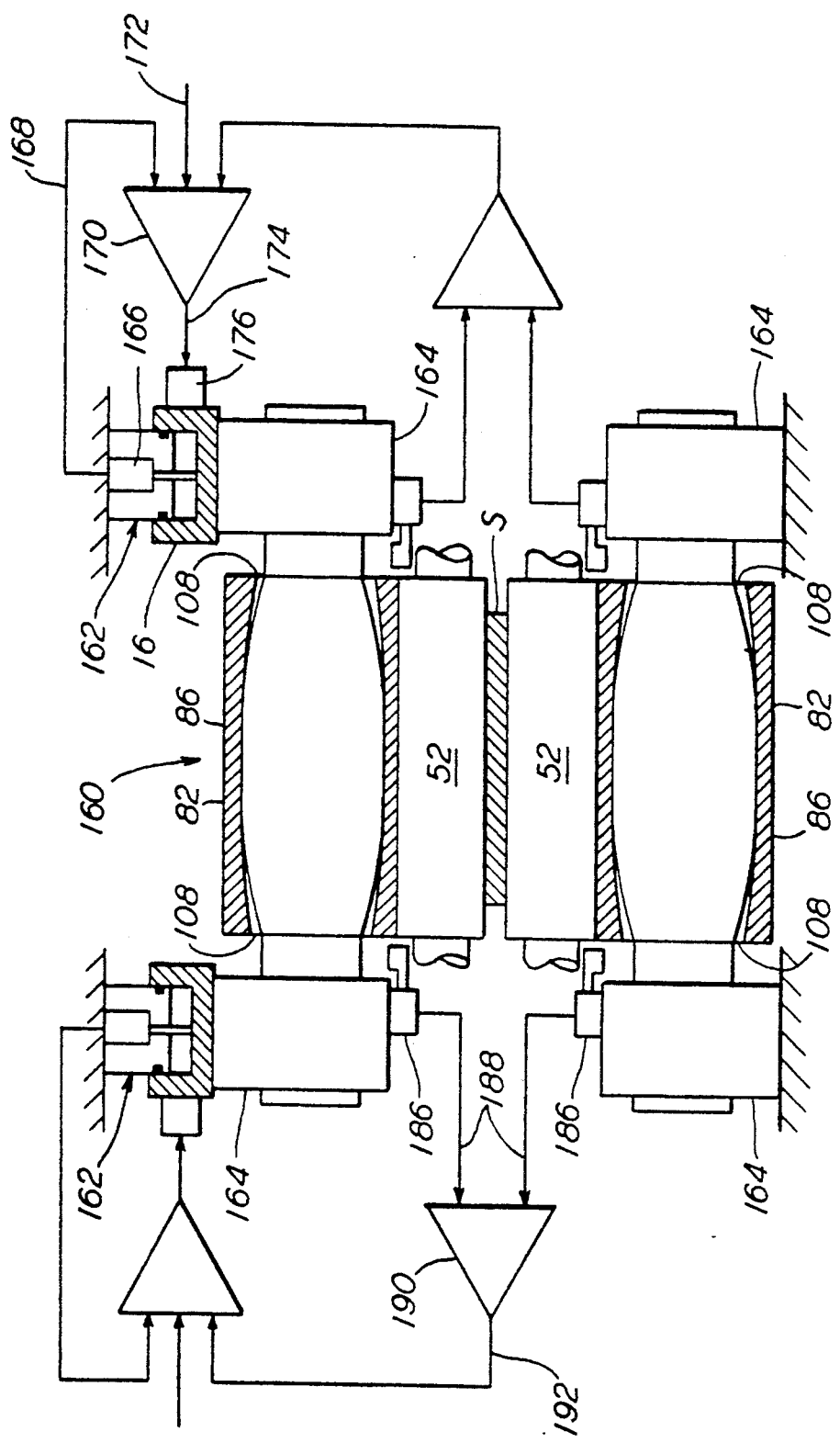
FIG. 8 is a schematic front view of rolls embodying the present invention wherein the rolls are employed in a four-high mill as backup rolls.

FIG. 8 generally shows a 4-high mill 160 employing work rolls 161 and backup rolls 82 (which are shown in more detail in FIG. 5) to roll a flat workpiece "S". Such a mill 160 may be advantageously employed in combination with known control systems to roll flat workpieces having good shape and other properties. Whatever the control system may be, it will include a means such as hydraulic piston cylinder assemblies 162 or an electrically operated screw-down (not shown) for exerting roll forces on roll chocks 164 to control the roll gap. As is shown in FIG. 8, a conventional piston cylinder assembly 162 may be controlled via a feed back type of control loop. Thus, a roll gap sensor 166, senses piston position or cylinder pressure and then outputs a feed back signal on line 168 to a roll gap regulator 170. The regulator 170 compares the feed back signal with a reference signal from line 172 that is input manually or by a supervisory computer or a microprocessor (either of which may incorporate the regulator 170), and then outputs a control signal on line 174 to a hydraulic fluid servovalve 176 operatively connected with the piston cylinder 178.

FIG. 8 also shows a means for continuously compensating for backup roll eccentricity during rolling. Backup roll eccentricity sensors 186 are installed adjacent the upper backup roll chocks 164, and preferably the lower backup roll chocks 164 (as is shown), to sense the eccentricity of the backup roll(s) 82. Each eccentricity sensor 186 detects the vertical displacement of the backup roll surface 86 with reference to the adjacent bearing chock 164 and then outputs an eccentricity correction signal on an output line 188 to the roll gap regulator 170. Where eccentricity sensors 186 sense the eccentricity of both backup rolls 82, the output signals on lines 188 may be advantageously added by a summing amplifier 190 and the added signals output on feed back line 192 to the roll gap regulator 170. The regulator 170 may then add the summed eccentricity signal to the reference signal and compare the actual roll gap feedback signal for outputting a control signal on line 174.

Figure 9:
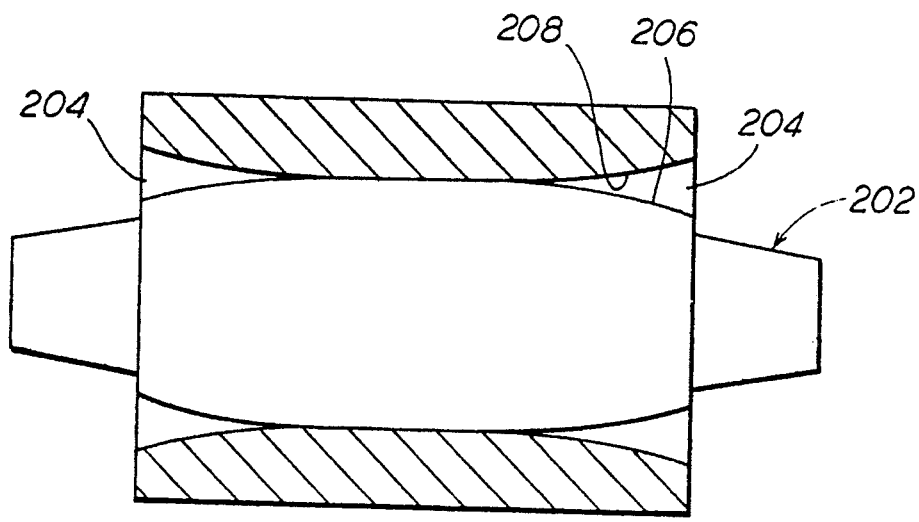
FIG. 9 is a front view of a fourth embodiment of a sleeved roll embodying the present invention.
Figure 10:
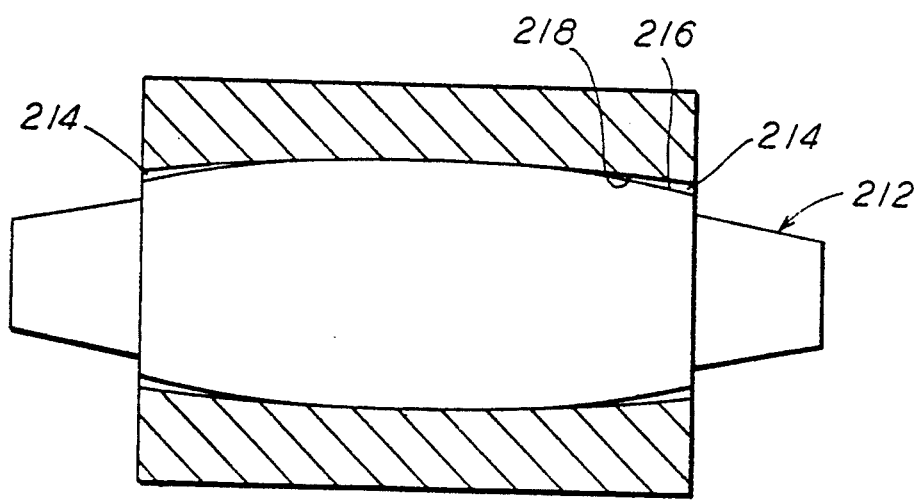
FIG. 10 is a front view of a fifth embodiment of a sleeved roll embodying the present invention.
Figure 11:
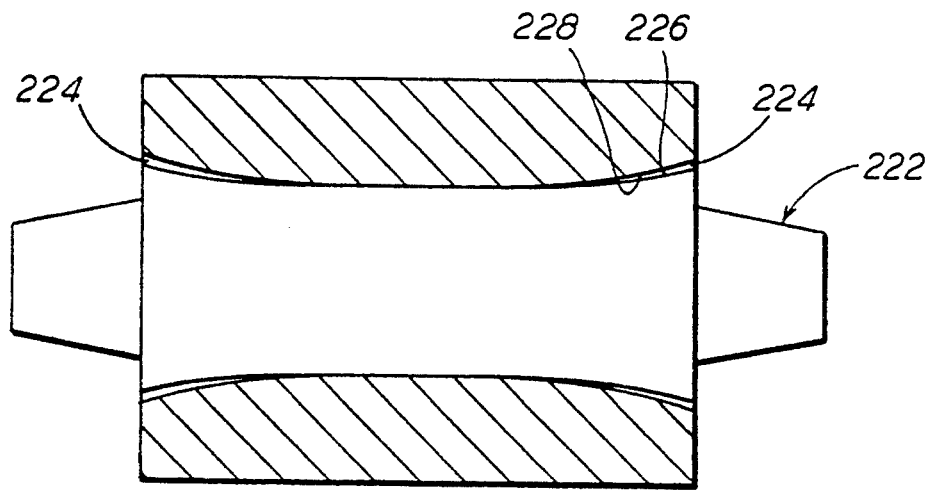
FIG. 11 is a front view of a sixth embodiment of a sleeved roll embodying the present invention.
Figure 12:
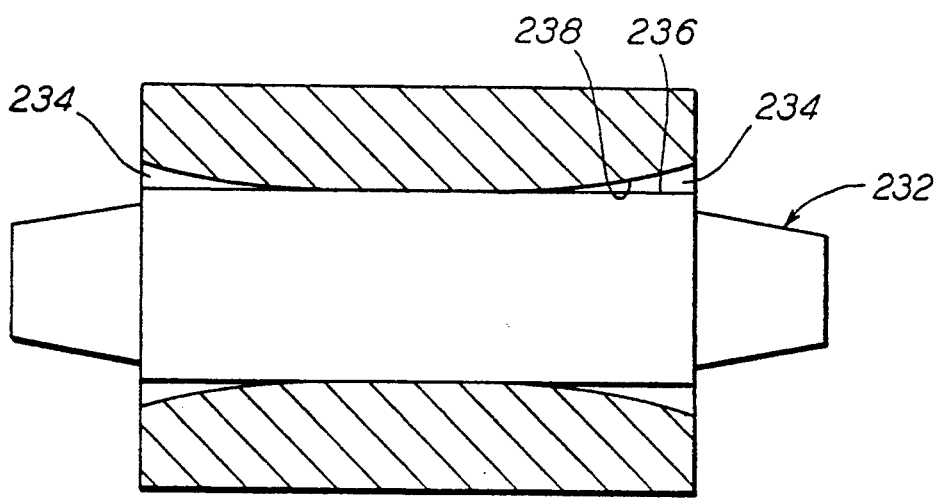
FIG. 12 is a front view of a seventh embodiment of a sleeved roll embodying the present invention.

In addition to the rolls 52 and 82 shown in FIGS. 4, 5 and 8, which generally comprises convexly contoured arbors and cylindrical sleeves (before the shrink-fit), rolls embodying the present invention may also have other contoured shrink-fit zones provided that the arbor peripheral surface or the sleeve inner surface is contoured (i.e., other than cylindrical) in the shrink-fit zone. FIG. 9 generally shows a roll 202 having end cavities 204, and a convexly contoured arbor 206 and a convexly contoured sleeve 208. FIG. 10 generally shows a roll 212 having end cavities 214, and a convexly contoured arbor 216 and a concavely contoured sleeve 218. FIG. 11 generally shows a roll 222 having end cavities 224, and a concavely contoured arbor 226 and a convexly contoured sleeve 228. FIG. 12 generally shows a roll 232 having end cavities 234, and a cylindrically contoured arbor 236 and a convexly contoured sleeve 238. Rolls similar to roll 52 of FIG. 4 may be contoured like the rolls 202, 212, 222 and 232 shown in FIGS. 9–12.

In accordance with the invention, rolls as above described may be used in rolling metal sheet and strip workpieces having (1) reduced variation of the workpiece crown with variation of roll force, rolled material hardness and width, and degree of reduction, and (2) reduced edge drop.

Strip crown is defined as a difference in workpiece, e.g. strip, thickness at its center and at approximately 25 mm from its edges. Edge drop is defined as a difference in the strip thickness at approximately 75 mm and 25 mm from its edges.

Figure 13:
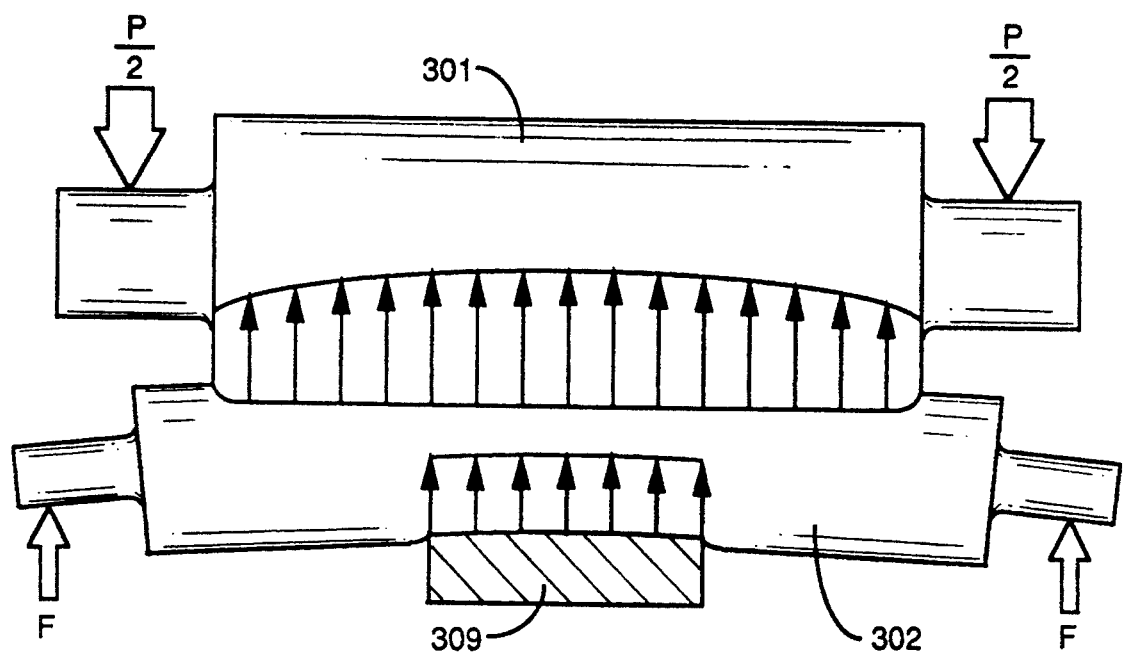
FIG. 13 is a front elevational view of a conventional pair of work roll and backup roll operating upon a workpiece and showing roll flattening during rolling.
Figure 14:
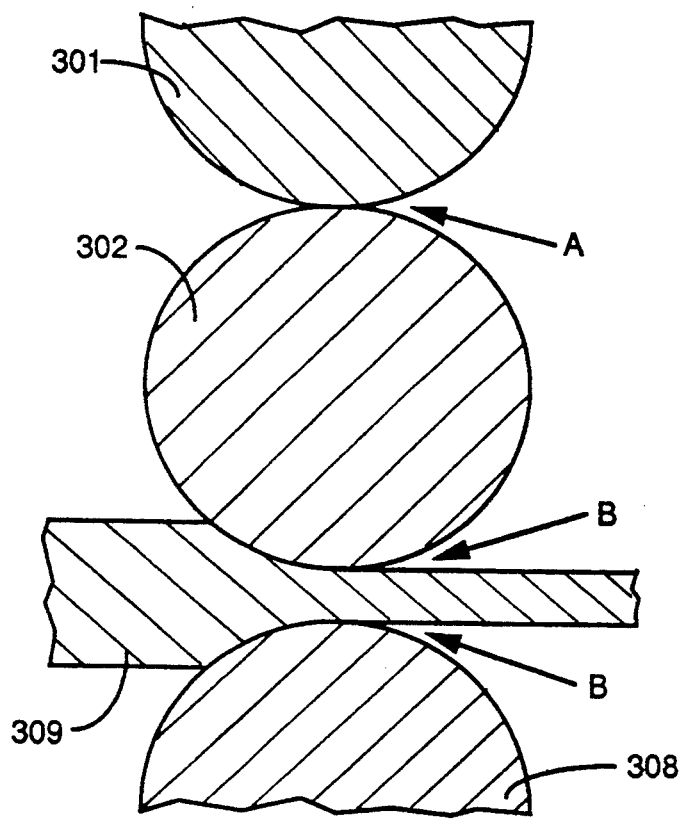
FIG. 14 is an elevational cross-sectional view of a conventional pair of work rolls and a backup roll, showing flattening of the rolls during rolling.

Crown variation is reduced by use of self-compensating backup rolls. But the main cause of edge drop is roll flattening and it has been found that this problem cannot be fully solved simply with use of self-compensating backup rolls. Two types of roll flattening occur. See FIG. 13 (in which the arrows indicate the direction of inter-roll forces causing flattening) and FIG. 14. The first type of roll flattening takes place in the interface zone A between the work roll 302 and the backup roll 301 (FIG. 14). The second type of roll flattening occurs in the interface zones B between the work rolls 302 and the workpiece 309 (FIG. 14). The roll flattening effect in the zones B has a more pronounced effect on the strip profile than the roll flattening in the interface zone A between the work roll and the backup roll.

Figure 15:
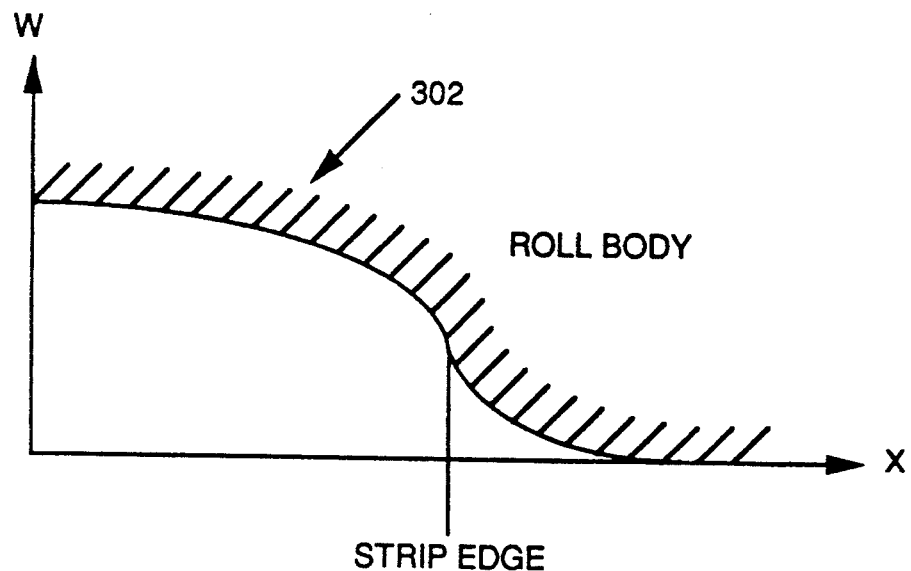
FIG. 15 shows a typical form of indentation of a work roll in the interface zone between the work roll and a workpiece.

FIG. 15 shows, in exaggerated scale, a typical form of indentation of a conventional work roll 302 in the interface zone between the work roll and the workpiece. The roll indentation is distinctly tapered down at the edges of the strip producing the edge drop.

Figure 16:
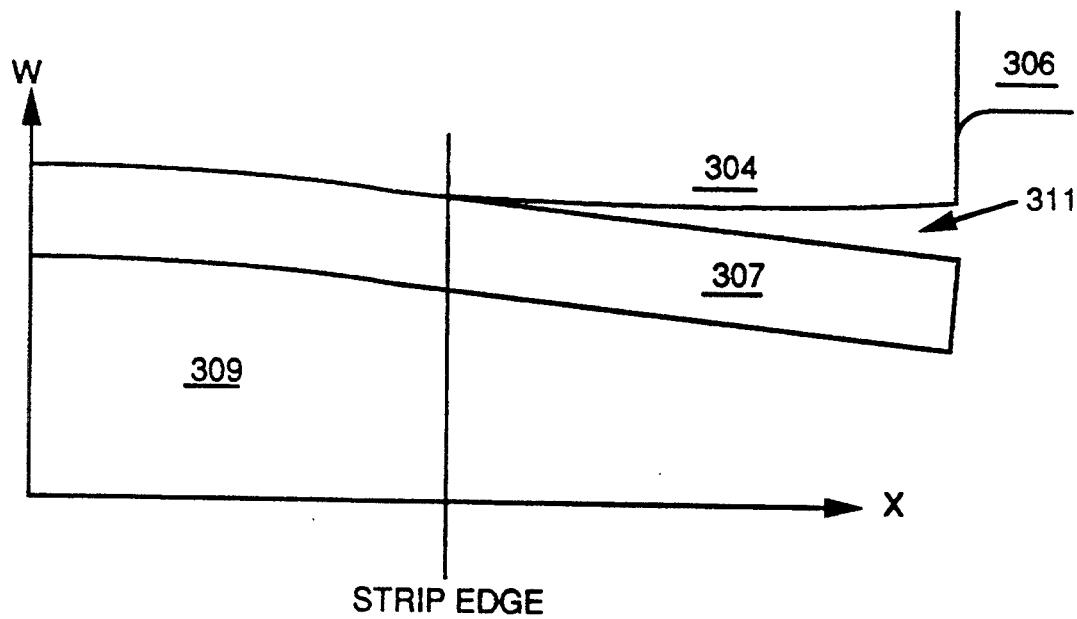
FIG. 16 is a partial view of a self-compensating work roll according to the invention and showing the elimination or substantial reduction of edge drop of the workpiece during rolling.

While self-compensating backup rolls have previously been used for improving uniformity of a desired strip cross-section, as described above, and the problem of edge drop has been addressed by other means, for example Feldman, U.S. Pat. No. 4,479,374 wherein the problem shown in FIG. 15 is solved by removing metal from the work roll beyond the strip edge (not a self-compensating roll), I have found that edge drop can be substantially reduced or eliminated by use of at least one self-compensating work roll, for example, as above described. This desirable effect of rolling with such a work roll is illustrated in FIG. 16. Such a rolling method avoids the complicated in-line metal removal steps as described in the mentioned Feldman patent, and is more effective in regard to solution of the edge drop problem than is the use of self-compensating backup rolls.

Figure 17:
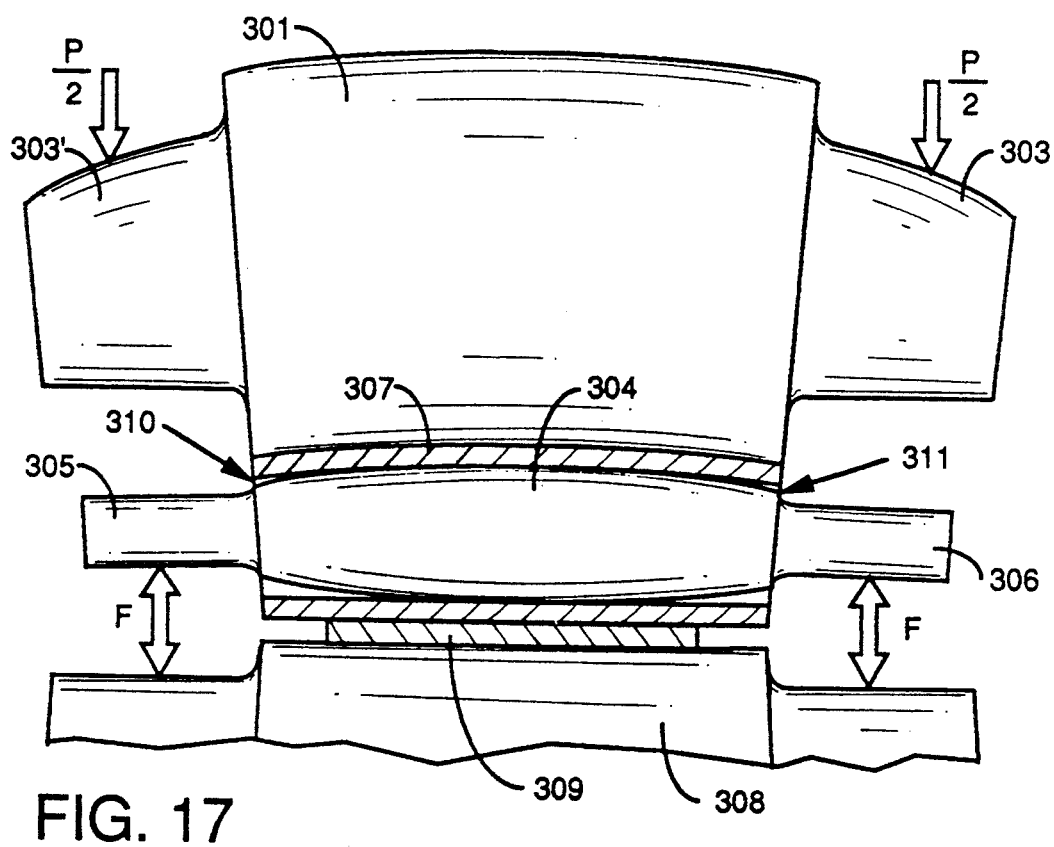
FIG. 17 is a front elevational view of a backup roll and self-compensating work roll operating on a workpiece in accordance with the present invention.
Figure 18:
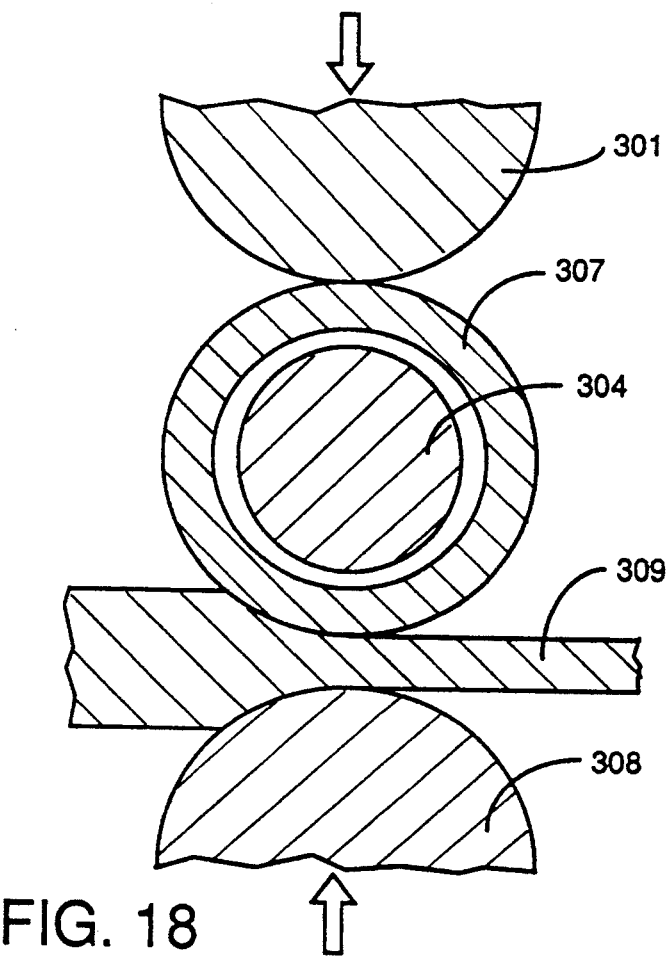
FIG. 18 is an elevational cross-sectional view of a pair of self-compensating work rolls and a backup roll operating on a workpiece in accordance with this invention.

FIGS. 17 and 18 show such a self-compensating work roll, wherein the (top) work roll comprises an arbor 304 with roll necks 305 and 306, and hollow sleeve 307 which is shrink-fitted on the arbor 304. Axial end portions of the arbor and sleeve are spaced apart to form cylindrical cavities 310 and 311. The thickness of the cavities 310 and 311 gradually increases toward the ends of the roll body. It is to be understood that a bottom work roll 308 may be similarly constructed.

The work roll 304 is backed up by backup roll 301 having roll necks 303 and 303' and is forced against a workpiece 309. The roll force P is applied to the necks 303 and 303' of the backup roll 301. The vertical plane work roll bending forces F are applied to the work roll necks 305 and 306. The horizontal plane roll bending forces (not shown) can also be applied through either the roll necks or through the roll body or through both.

As is evident from FIG. 18, application of the rolling forces to the self-compensating work roll results in a resilient flattening of the sleeve but not of the arbor which retains its circular cross-section.

Figure 19:
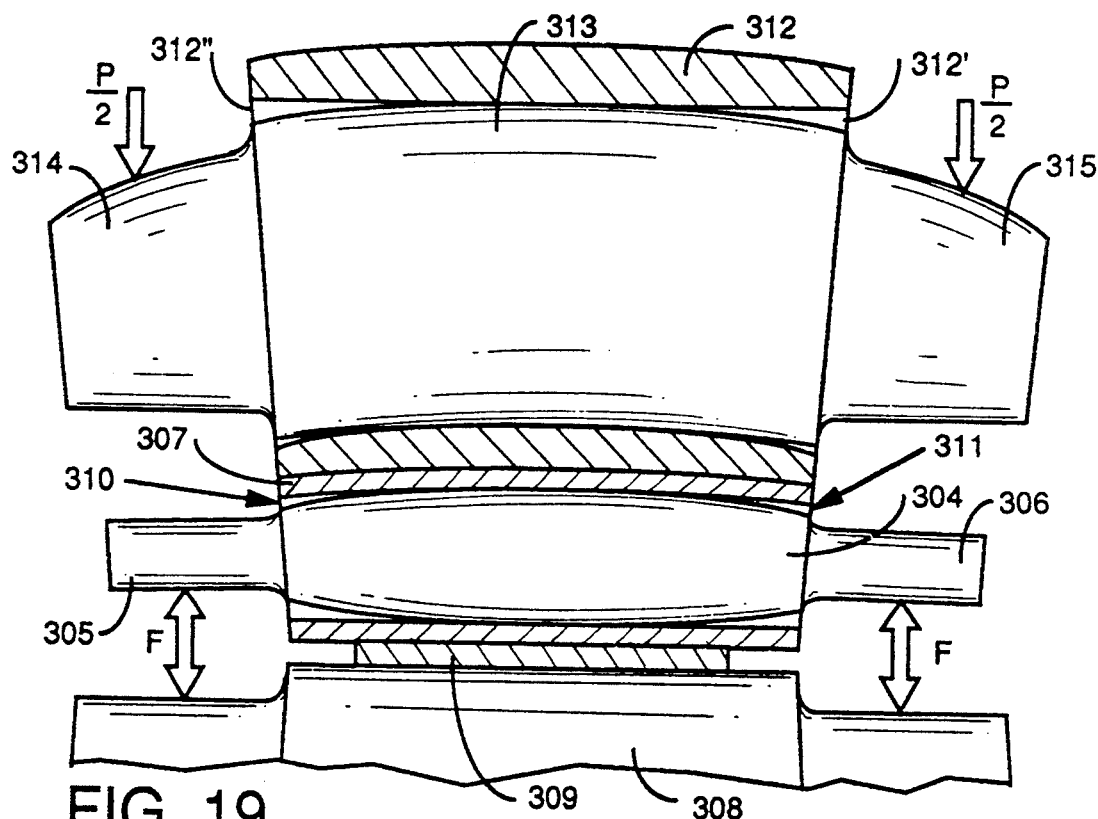
FIG. 19 is a front elevational view of a self-compensating work roll and a self-compensating backup roll operating on a workpiece in accordance with this invention.

FIG. 19 shows a roll stack arrangement similar to that of FIG. 18 but including a backup roll comprising an arbor 313 with roll necks 314 and 315, and sleeve 312 which, with the arbor, defines cavities 312' and 312" forming self-compensating flexible end portions of the roll. As shown in FIG. 19, the self-compensating flexible ends of the backup roll are opposed to a corresponding flexible self-compensating end of a work roll.

Figure 20:
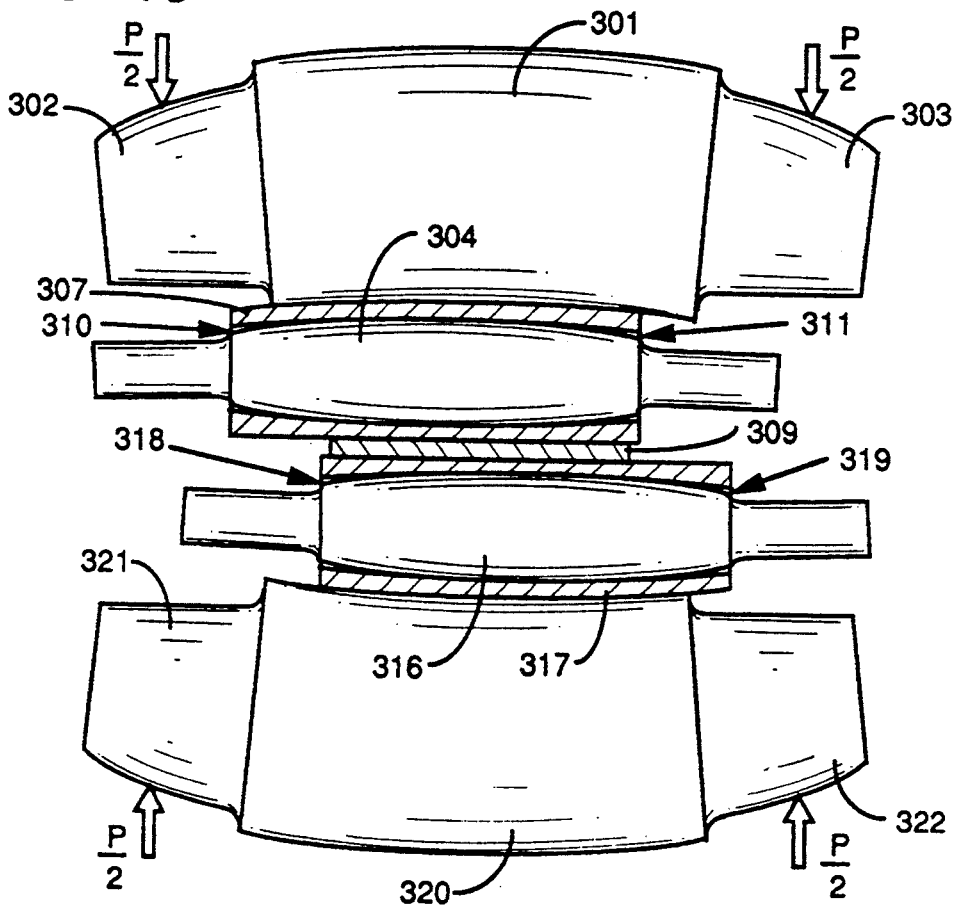
FIG. 20 is another front elevational view of a pair of self-compensating work rolls and a pair of backup rolls operating on a workpiece in accordance with the invention, and wherein the work rolls are positioned by axial shifting.

FIG. 20 shows a roll stack arrangement with roll shifting self-compensating work rolls. The rolls are shifted in opposite directions to locate their flexible ends near the workpiece edges so that the effect of compensation for roll flattening is optimized for each particular width of the workpiece. This arrangement includes, in addition to the top work roll and top backup roll as shown in FIG. 17, a bottom work roll comprising an arbor 316 and sleeve 317 defining flexible end cavities 318 and 319; also a bottom backup roll comprising arbor 320 with roll necks 321 and 322.

Figure 21:
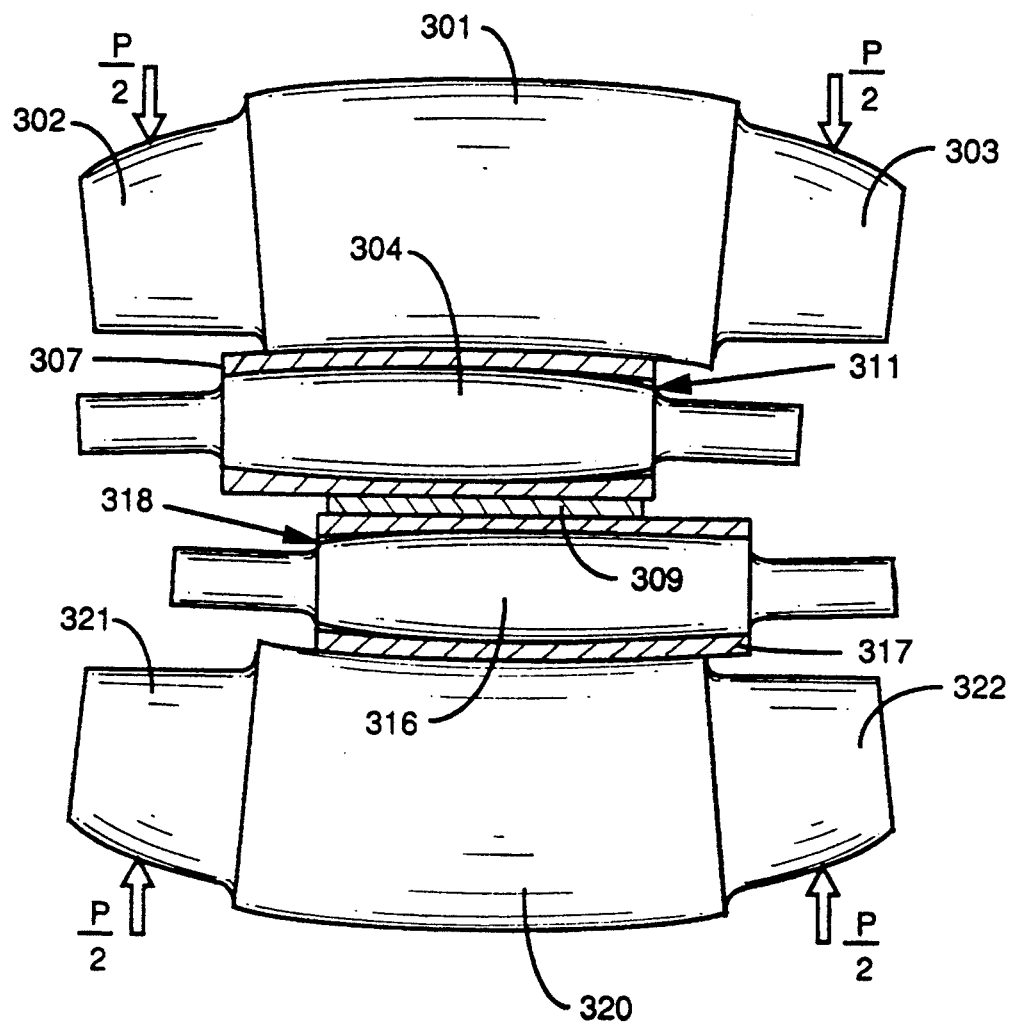
FIG. 21 is a front elevational view of, similar to FIG. 20, but showing another form of self-compensating work rolls and a pair of backup rolls operating on a workpiece in accordance with the invention.

FIG. 21 shows an arrangement similar to that shown in FIG. 20 but comprising work rolls having cavities 311 and 318 between arbors 304 and 316 and sleeves 307 and 317 at only one side of each work roll rather than at both sides as shown in FIG. 20. In this arrangement, the cavities 311 and 318 are located at opposite ends of the work rolls.

Because of the present designs, the self-compensating work roll of the invention is more rigid at the middle of the shrink-fit zone in comparison to its edge zones. As a result, the roll force applied to the roll will deform the sleeve edges as shown in FIG. 18. In this case, there is no local flattening of the work roll; rather, the entire sleeve is resiliently deflected. This reduces a tapered character of the roll flattening (FIG. 15) as shown in FIG. 16.

While presently preferred embodiments of the invention, including improved bendable sleeved rolls and methods for assembling these rolls, and rolling mills and rolling methods employing them have been described and shown, it is to be distinctly understood that the invention is not limited thereto, but may be otherwise variously embodied within the scope of the following claims.

What is claimed is:

1. A method of rolling an elongated metal workpiece in the form of a sheet or strip, which method comprises passing the workpiece through at least one pair of opposed work rolls comprising an arbor and a hollow sleeve shrink-fitted over the arbor, maintaining maximum radial stresses in a central portion of a shrink-fitted zone, decreasing radial stresses between the arbor and the sleeve towards the ends of the shrink-fitted zone whereby axially spaced shrink-fitted end zones of the sleeve are adapted to slide over corresponding axially spaced shrink-fitted end zones of the arbor, providing a self-compensating roll end by radially spacing apart axial end portions of the arbor and axial end portions of the sleeve thereby preventing inducement of shear stresses between the axial end portions of the arbor and the sleeve and reducing edge drop of the workpiece, wherein a dimension of the radial spacing of the arbor and sleeve end portions transverse to an axial direction of the work roll increases toward axial ends of the work roll, and backing up each pair of work rolls by a pair of backup rolls each of which comprises an arbor and a similarly shrink-fitted hollow sleeve and having self-compensating end portions formed by radially spacing end portions of the backup roll arbor and sleeve, whereby crown variation of the workpiece is reduced during rolling.

2. A method according to claim 1, further comprising positioning a self-compensating end portion of a work roll adjacent a longitudinal edge of the workpiece during rolling.

3. A method according to claim 2, further comprising positioning a self-compensating end portion of a backup roll adjacent a self-compensating end portion of a work roll.

4. A method according to claim 3, wherein the rolls are axially shifted to desired positions thereof.

* * * * *